Jan. 31, 1961 K. DOLLINGER 2,970,276

NOISE REDUCTION SYSTEMS

Filed July 3, 1958

INVENTOR
KENNETH DOLLINGER

BY H. Vincent Harsha

ATTORNEY

United States Patent Office 2,970,276
Patented Jan. 31, 1961

2,970,276

NOISE REDUCTION SYSTEMS

Kenneth Dollinger, Derry, N.H., assignor to Raytheon Company, a corporation of Delaware Filed July 3, 1958, Ser. No. 746,413

7 Claims. (Cl. 330—9)

This invention relates generally to electronic devices such as amplifiers, oscillators and the like and more particularly to a system which may be interconnected with such devices to substantially eliminate noise or hum generated within such devices during their operation.

The primary object of this invention is to provide an effective and simple noise elimination system for integral use with various types of electronic devices.

A specific object of this invention is to provide a noise elimination system for use with electronic devices wherein synchronous switching is utilized to obtain a pair of output signals from such devices which are subtractively combined and passed through a filter to obtain an output signal substantially free of noise generated within such devices.

Figure 1:
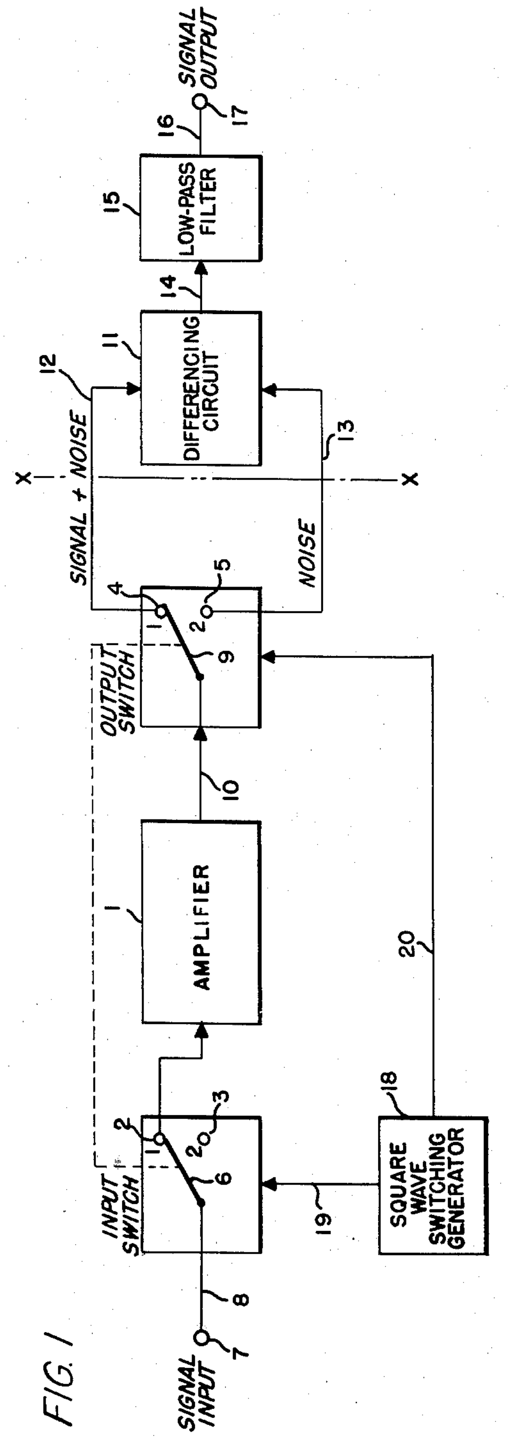
Figure 2:
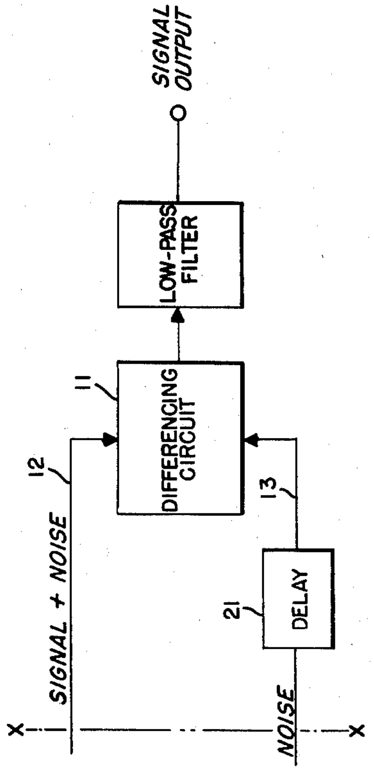

With the foregoing and other objects in view the invention resides in the following specification and appended claims, certain embodiments of which are illustrated in the accompanying drawings in which:

Figure 1 is a block diagram of the system comprising the invention as connected to an electronic device, and Figure 2 illustrates a modification of a portion of the system illustrated in Figure 1.

Referring more particularly to Figure 1 an electronic device 1, such as an amplifier, is illustrated as having input terminals 2 and 3 and output terminals 4 and 5. Terminals 2 and 3 are engaged by a switch 6 under the control of means to be later described. The switch 6, while illustrated as a pivoted blade, preferably would comprise a tube switching means. Switch 6 is connected to a signal input terminal 7 by a line 8.

Output terminals 4 and 5 are engaged by a switch 9 under the control of means to be later described. Switch 9 is connected by a line 10 to the electronic device 1. A differencing or subtractive circuit 11 is connected by a line 12 to terminal 4 and by a line 13 to terminal 5. The circuit 11 is connected by a line 14 to a low-pass filter 15. Filter 15 is connected by a line 16 to a signal output terminal 17.

The system is further provided with a square wave generator 18. Generator 18 is connected by a line 19 to switch 6 and by a line 20 to switch 9. The generator 18 is effective during operation to alternately open and close the signal input circuit to the device 1 by moving the switch 6 from its closed circuit terminal 2 to its open circuit terminal 3. As a result of the switching an input signal at the terminal 7 is fed to the device 1 in the form of a series of pulses, the envelope of which reproduces the original signal. The output signal of the device 1 now consists of the chopped-up input signal plus any noise generated internally of the device 1. The output of the device 1 is then applied to the switch 9. Switch 9 alternately engages terminals 4 and 5 under the control of the frequency of the square generator 18. The switches 6 and 9 are synchronously operated by generator 18 so that terminals 2 and 4 or terminals 3 and 5 are simultaneously contacted.

With the switches 6 and 9 in the positions illustrated the input signal will pass through terminal 2, the device 1 and output terminal 4 through line 12 to the differencing circuit 11. When the switches 6 and 9 move to terminals 3 and 5 no input signal is fed to device 1 since terminal 3 is an open circuit contact. Internally generated noise signals from the device 1 however are fed over line 10 to terminal 5 and then to the circuit 11 through line 13. The lines 12 and 13 represent parallel paths for applying either a signal derived from the input plus noise to the circuit 11 or a noise signal only to circuit 11. If the switching frequency is high compared to the bulk of the noise spectrum, it can be expected that noise samples received in both switch positions will be substantially coherent. If then the output of the noise path 13 is subtracted from the output of the signal plus noise channel in the differencing circuit 11 and the resulting signal is applied to the low pass filter 15, noise cancellation will result to the extent that the noise samples received by the two channels are coherent with each other. The low pass filter serves a dual function in integrating the individual pulses received from circuit 11, thus allowing the differencing to become effective, and also in reducing the overall system bandwidth to that originally necessary for the transmission of the signal bandwidth. This is necessary since the bandwidth of the device 1, as an amplifier, must be wide enough to accommodate the chopped up signal and therefore must be at least capable of passing the repetition frequency. The low pass filter removes the repetition frequency from the output and all noise components above the original signal frequency bandwidth.

Since the two paths 12 and 13 receive signals at intervals separated by half the switching repetition frequency, the insertion of a delay circuit 21 in one path, shown in path 13 in Figure 2, equal to one half the pulse repetition period would allow the signals from both paths to appear at the differencing circuit 11 at the same time with the result that the differencing circuit would then produce an output equal to the difference between signal plus noise and noise pulses. The results obtained from this modification will be substantially the same as for the system of Figure 1. The low pass filter is still required to remove the repetition frequency.

It should therefore be obvious to one skilled in the art that this invention provides an effective system for use with amplifiers and the like to procure signals substantially free of internally generated noise. It is further obvious that the exact circuitry for practicing the invention may take many forms well within the purview of this inventor who intends only to be limited by the general scope of the appended claims.

I claim:

1. A system for reducing internally generated noise in an electronic device including input and output terminals which comprises switching means connected to the device at its input terminals, switching means connected to said device at its output terminals, said input switching means including one terminal to close a circuit for an incoming signal to the device and an open terminal, said output switching means including a first and second terminal, means to simultaneously switch each of said switching means from one terminal to the other of a frequency high with respect to the bulk of the noise spectrum and means to combine the output signals from the first and second output switching terminals in a subtractive manner to derive an output signal which is substantially free of noise generated within said device.

2. A system for reducing internally generated noise in an electronic device including input and output terminals which comprises switching means connected to the device at its input terminals, switching means connected to said device at its output terminals, said input switching means including one terminal to close a circuit for an incoming signal and an open terminal, said output switching means including a first terminal corresponding to the closed circuit terminal of said first switching means, and a second terminal corresponding to the open terminal of said first switching means, means to synchronously switch each of said switching means from one terminal to the other of a frequency high with respect to the bulk of the noise spectrum, and means to combine the output signals from the first and second terminals in a subtractive manner to derive an output signal which is substantially free of noise generated within said device.

3. The invention according to claim 1 in which said synchronously acting switching means comprises a square wave generator.

4. A system for reducing internally generated noise in an electronic device including input and output terminals which comprises switching means connected to the device at its input terminals, switching means connected to said device at its output terminals, said input switching means including one terminal to close a circuit for an incoming signal and an open terminal, said output switching means including a first terminal corresponding to the closed circuit terminal of said first switching means, and a second terminal corresponding to the open terminal of said first switching means, means to synchronously switch each of said switching means from one terminal to the other of a frequency high with respect to the bulk of the noise spectrum, a difference circuit means, circuit means connecting the first and second output terminals of the device to said difference circuit means, delay means connected in the circuit means between the second terminal and the difference circuit, an output terminal for said noise reducing system, and a low pass filter connected between said system output terminal and the difference circuit.

5. The invention according to claim 4 in which said synchronously acting switching means comprises a square wave generator.

6. A system for reducing internally generated noise in an electronic device including input and output terminals which comprises switching means connected to the device at its input terminals, switching means connected to said device at its output terminals, said input switching means including one terminal to close a circuit for an incoming signal and an open terminal, said output switching means including a first terminal corresponding to the closed circuit terminal of said first switching means, and a second terminal corresponding to the open terminal of said first switching means, means to synchronously switch each of said switching means from one terminal to the other of a frequency high with respect to the bulk of the noise spectrum, a difference circuit means, circuit means connecting the first and second output terminals of the device to said difference circuit means, an output terminal for said noise reducing system, and a low pass filter connected between said system output terminal and the difference circuit.

7. The invention according to claim 6 in which said synchronously acting switching means comprises a square wave generator.

References Cited in the file of this patent

UNITED STATES PATENTS

| | | |
|---|---|---|
| 2,113,212 | Landon | Apr. 5, 1938 |
| 2,192,275 | Royer | Mar. 5, 1940 |
| 2,268,998 | Bay | Jan. 6, 1942 |
| 2,311,696 | Rubin | Feb. 23, 1943 |
| 2,371,416 | Tunick | Mar. 13, 1945 |
| 2,622,150 | Coutler | Dec. 16, 1952 |
| 2,776,410 | Guanella | Jan. 1, 1957 |